United States Patent

Hirasako

(10) Patent No.: US 11,692,621 B2
(45) Date of Patent: Jul. 4, 2023

(54) CONTROL DEVICE FOR AUTOMATIC TRANSMISSION AND CONTROL METHOD FOR AUTOMATIC TRANSMISSION

(71) Applicants: JATCO Ltd, Fuji (JP); NISSAN MOTOR CO., LTD., Yokohama (JP)

(72) Inventor: Kazuki Hirasako, Komae (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 7 days.

(21) Appl. No.: 17/619,649

(22) PCT Filed: Jun. 3, 2020

(86) PCT No.: PCT/JP2020/021854
§ 371 (c)(1),
(2) Date: Dec. 16, 2021

(87) PCT Pub. No.: WO2020/255706
PCT Pub. Date: Dec. 24, 2020

(65) Prior Publication Data
US 2022/0349467 A1   Nov. 3, 2022

(30) Foreign Application Priority Data

Jun. 20, 2019 (JP) .............................. JP2019-114457

(51) Int. Cl.
*F16H 59/66* (2006.01)
*F16H 59/44* (2006.01)
*F16H 61/02* (2006.01)

(52) U.S. Cl.
CPC ............. *F16H 59/44* (2013.01); *F16H 59/66* (2013.01); *F16H 61/0213* (2013.01); *F16H 2059/663* (2013.01); *F16H 2061/0234* (2013.01)

(58) Field of Classification Search
CPC ...... F16H 59/44; F16H 59/66; F16H 61/0213; F16H 2059/663; F16H 2061/0234
See application file for complete search history.

(56) References Cited

U.S. PATENT DOCUMENTS 4,660,672 A * 4/1987 Katou .................. B60K 31/047
                                                    180/178
5,609,546 A * 3/1997 Torii .................... B60K 31/047
                                                    477/121

(Continued)

FOREIGN PATENT DOCUMENTS

JP    H10-132071 A    5/1998
JP    2002-122225 A   4/2002

(Continued)

*Primary Examiner* — Edwin A Young
(74) *Attorney, Agent, or Firm* — Foley & Lardner LLP (57) ABSTRACT

A control device for an automatic transmission in a vehicle with a constant speed travel mode includes: a determination section that determines whether the vehicle is traveling on a slope road; a slope adaptation control section that implements a first transmission shift control if not traveling on a slope road and, if traveling on a slope road, implements a second transmission shift control for selecting a transmission shift position of a lower speed than case of not traveling on a slope road; a delaying section that, upon switching from the second transmission shift control to the first transmission shift control, implements an upshift delay control for performing upshift one by one at a predetermined time interval; and a setting section that, in case of traveling at the constant speed travel mode, sets the time interval shorter in comparison with case of traveling not at the constant speed travel mode.

5 Claims, 4 Drawing Sheets

(56) References Cited

U.S. PATENT DOCUMENTS

| | | | | |
|---|---|---|---|---|
| 5,685,801 A | * | 11/1997 | Benford | B60K 31/047 |
| | | | | 477/108 |
| 6,138,070 A | * | 10/2000 | Shimanaka | F16H 61/66259 |
| | | | | 701/52 |
| 2002/0049116 A1 | | 4/2002 | Shiiba et al. | |
| 2015/0184742 A1 | | 7/2015 | Inagawa et al. | |
| 2018/0141540 A1 | | 5/2018 | Kumazaki et al. | |
| 2019/0338849 A1 | * | 11/2019 | Chunodkar | B60W 10/06 |

FOREIGN PATENT DOCUMENTS

| | | |
|---|---|---|
| JP | 2018-80814 A | 5/2018 |
| WO | WO-2013/183362 A1 | 12/2013 |

\* cited by examiner

CONTROL DEVICE FOR AUTOMATIC TRANSMISSION AND CONTROL METHOD FOR AUTOMATIC TRANSMISSION

TECHNICAL FIELD

The present invention relates to a control device for an automatic transmission installed in a vehicle that has a constant speed travel mode.

BACKGROUND ART

Patent Document 1 discloses a vehicle control device that has a first travel mode and a second travel mode. The first travel mode is a travel mode to perform transmission shift control on an automatic transmission and driving force control, in accordance with acceleration and deceleration operation by a driver. The second travel mode is a travel mode to set a target travel condition such as a target vehicle speed, and perform transmission shift control and driving force control independently of the acceleration and deceleration operation by a driver: i.e., so-called a constant speed travel mode. The second travel mode includes control to suppress frequent implementation of transmission shift, in order to avoid busy shift. In addition, the constant speed travel mode is normally brought to forcible termination if a vehicle speed deviates from a vehicle speed range having a certain width including the target vehicle speed.

There is another known art for controlling an automatic transmission: a transmission shift control device that has a slope travel mode. The slope travel mode is a travel mode for travel on a slope road (either an upward slope road or a downward slope road) which is configured to select a transmission shift position of a lower speed than that for travel on a flat road, and operate an engine in a relatively high engine speed region. The slope travel mode serves to obtain a driving force required for climbing on an upward slope road, and obtain a braking force due to engine brake on a downward slope road. This device monitors an inclination of a travel road during vehicle traveling, and switches to the slope travel mode in response to an upward slope road above a predetermined upward inclination or a downward slope road below a predetermined downward inclination, and returns to a normal transmission shift mode in response to transition from slope road travel to flat road travel at the slope travel mode. This return process is accompanied by upshift in transmission shift position from a lower speed position to a higher speed position. Furthermore, this upshift is implemented under an upshift delay control in which the upshift in transmission shift position proceeds one by one at predetermined time intervals, in order to avoid busy shift.

In case that a vehicle has both of the constant speed travel mode and the slope travel mode and is configured to implement the upshift delay control, and that the vehicle selects the both travel modes and travels on a slope road at the constant speed mode, the vehicle increases in engine speed so as to maintain a constant speed under a low speed transmission shift position set due to the slope travel mode. Accordingly, when implementing the upshift delay control upon upshift in transmission shift position from a lower speed position to a higher speed position in response to transition from slope road travel to flat road travel at the slope travel mode, the delay in upshift results in a retard in fall in engine speed and then a retard in fall in engine driving force, and causes the engine driving force to be excessive in comparison with a driving force required for constant speed travel on the flat road. This may cause the vehicle to accelerate after the transition to the flat road, and deviate in vehicle speed from a vehicle speed range for the constant speed travel mode, and thereby interrupt maintenance of the constant speed travel mode.

In view of the foregoing problem, in case of a vehicle that has both of the constant speed travel mode and the slope travel mode and is configured to implement the upshift delay control, it is desirable to suppress the vehicle from undergoing excess in driving force upon transition from slope road travel to flat road travel at the constant speed travel mode. Furthermore, it is also desirable to produce effects that are not obtained from conventional arts, but are obtained due to configurations shown in the mode for carrying out the present invention described below.

PRIOR ART DOCUMENT(S)

Patent Document(s)

Patent Document 1: JP 2018-80814 A

SUMMARY OF THE INVENTION (1) According to one aspect of the present invention, a control device for an automatic transmission installed in a vehicle having a constant speed travel mode configured to perform transmission shift control on the automatic transmission and driving force control on a driving prime mover in order to maintain a vehicle speed at a set speed includes: a determination section configured to determine whether or not the vehicle is traveling on a slope road; a slope adaptation control section configured to implement a first transmission shift control if determined that the vehicle is not traveling on a slope road, and implement a second transmission shift control if determined that the vehicle is traveling on a slope road, wherein: the first transmission shift control includes selecting a predetermined transmission shift position depending on a vehicle condition; and the second transmission shift control includes selecting, depending on the vehicle condition, a transmission shift position of a lower speed in comparison with case of determined that the vehicle is not traveling on a slope road; a delaying section configured to implement an upshift delay control upon switching from the second transmission shift control to the first transmission shift control, wherein the upshift delay control includes performing upshift in transmission shift position one by one at a predetermined time interval; and a setting section configured to, in case that the vehicle is traveling at the constant speed travel mode, set the time interval shorter in comparison with case that the vehicle is traveling not at the constant speed travel mode.

(2) It is favorable that the slope adaptation control section is configured to employ a first transmission shift map for travel on a flat road, in the first transmission shift control, and employ a second transmission shift map for travel on a slope road, in the second transmission shift control.

(3) It is favorable that the control device further incudes a constant speed travel mode selection switch configured to select the constant speed travel mode and a slope travel mode selection switch configured to select a slope travel mode in which the second transmission shift control is allowed to be selected.

(4) It is favorable that the constant speed travel mode is terminated in response to satisfaction of a condition that the vehicle speed deviates from the set speed at or beyond a predetermined amount.

(5) According to one aspect of the present invention, a control method for an automatic transmission installed in a vehicle having a constant speed travel mode configured to perform transmission shift control on the automatic transmission and driving force control on a driving prime mover in order to maintain a vehicle speed at a set speed includes: determining whether or not the vehicle is traveling on a slope road; implementing a first transmission shift control if determined that the vehicle is not traveling on a slope road, wherein the first transmission shift control includes selecting a predetermined transmission shift position depending on a vehicle condition; implementing a second transmission shift control if determined that the vehicle is traveling on a slope road, wherein the second transmission shift control includes selecting, depending on the vehicle condition, a transmission shift position of a lower speed in comparison with case of determined that the vehicle is not traveling on a slope road; implementing an upshift delay control upon switching from the second transmission shift control to the first transmission shift control, wherein the upshift delay control includes performing upshift in transmission shift position one by one at a predetermined time interval; and in case that the vehicle is traveling at the constant speed travel mode, setting the time interval shorter in comparison with case that the vehicle is traveling not at the constant speed travel mode.

The automatic transmission employing the present invention serves to suppress in driving force in a situation of moving from a slope road to a flat road at the constant speed travel mode, by shortening the time interval in the upshift delay control upon switching from the second transmission shift control to the first transmission shift control. Furthermore, the automatic transmission employing the present invention serves to suppress busy shift by performing upshift slowly without shortening the time interval in the upshift delay control, during travel not at the constant speed travel (i.e., travel in accordance with operation by a driver).

BRIEF DESCRIPTION OF THE DRAWINGS

FIGS. 2A and 2B are exemplary transmission shift maps.

MODE(S) FOR CARRYING OUT THE INVENTION

The following describes an embodiment of a control device for an automatic transmission, with reference to the drawings. The embodiment is merely an example, and is not intended to exclude various modifications or various arts inexplicit in the embodiment. Each of configurations in the embodiment may be variously modified and carried out within scope of the invention. It is also allowed to sift and/or combine the configurations as appropriate.

1. Overall System Configurations

Figure 1:
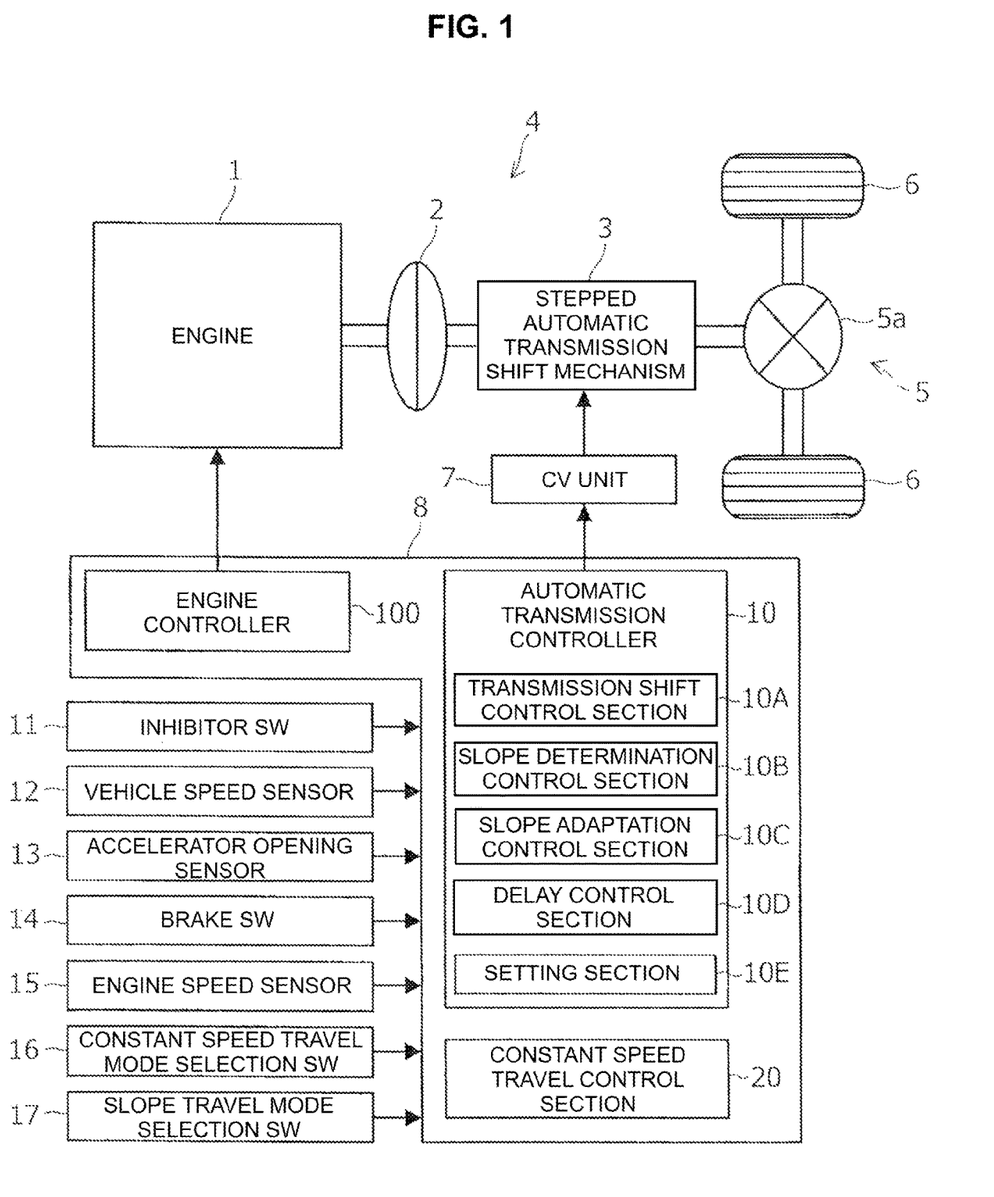
FIG. 1 is an overall view showing system configurations of a power train including a stepped transmission of a vehicle and a control system for the power train, according to an embodiment of the present invention.

FIG. 1 shows a power train of a vehicle according to the present embodiment. The power train includes an engine 1 (i.e., a driving prime mover), an automatic transmission 4 (i.e., a stepped automatic transmission), and a power transmission mechanism 5. The automatic transmission 4 includes a torque converter 2 including a lock-up clutch and an automatic transmission shift mechanism 3 of stepped type. The power transmission mechanism 5 includes a differential mechanism 5a disposed between an output shaft of the automatic transmission 4 and drive wheels 6.

The automatic transmission shift mechanism 3 is connected to the engine 1 via the torque converter 2 including the lock-up clutch not shown. The automatic transmission shift mechanism 3 includes various frictional engagement elements such as clutches and brakes, and achieves transmission shift with a plurality of transmission shift positions by engagement and release of the frictional engagement elements. The transmission shift positions of the automatic transmission shift mechanism 3 according to the present embodiment are composed of nine forward speed positions (i.e., first to ninth speed positions) and one reverse speed position.

The engagement and release of the various frictional engagement elements and engagement state of the lock-up clutch of the torque converter 2 are controlled by operating an appropriate solenoid valve disposed in a control valve unit (CV unit) 7 and thereby switching supply state of hydraulic oil.

For supply of hydraulic oil to the CV unit 7, oil pumps not shown are installed. The oil pumps include a mechanical oil pump driven by the engine 1 and an electric oil pump driven by an electric motor not shown. The electric oil pump serves to operate the frictional engagement elements during suspension of the engine 1.

The engine 1 and the CV unit 7 are operated under control of an electronic control unit (ECU) 8. The ECU 8 is an electronic control unit (i.e., a computer) configured to integrally control various devices mounted in the vehicle. The ECU 8 includes a processor (i.e., a central processor), a memory (i.e., a main memory), a storage, an interface device, etc., which are connected via internal buses.

The ECU 8 is connected to various sensors so as to receive input from them. The various sensors include an inhibitor switch (inhibitor SW) 11, a vehicle speed sensor 12, an accelerator opening sensor 13, a brake switch (brake SW) 14, an engine speed sensor 15, a constant speed travel mode selection switch (constant speed travel mode selection SW) 16, and a slope travel mode selection switch (slope travel mode selection SW) 17.

The inhibitor switch 11 is a sensor that monitors a position of a transmission lever not shown. The vehicle speed sensor 12 is a sensor that measures a travel speed of the vehicle (i.e., a vehicle speed). The accelerator opening sensor 13 is a sensor that measures a depression amount of an accelerator pedal (i.e., an accelerator opening degree). The brake switch 14 is a sensor that detects presence of an operation on a brake pedal not shown. In other words, the brake switch 14 monitors ON/OFF of the brake pedal.

The engine speed sensor 15 is a sensor that measures an engine speed of the engine 1. The constant speed travel mode selection switch 16 is a switch to select a constant speed travel mode. The constant speed travel mode is a travel mode to maintain a speed set by a driver (i.e., a set speed) independently of acceleration and deceleration operation by the driver. The slope travel mode selection switch 17 is a switch to select a slope travel mode that allows a second transmission shift control to be selected. In the present description, "slope road" may be either an upward slope road or a downward slope road. The slope travel mode includes implementation of the second transmission shift control to travel on a slope road with the engine 1 operated in a relatively high engine speed region by selecting a transmission shift position of a lower speed than that for travel on a flat road. In an upward slope road, the slope travel mode serves to obtain a driving force required for climbing, by using the second transmission shift control. In a downward slope road, the slope travel mode serves to obtain a braking force due to engine brake, by using the second transmission shift control.

2. Control Configurations

The ECU 8 includes an automatic transmission controller 10 (i.e., a control device for an automatic transmission) for controlling the CV unit 7 and an engine controller 100 for controlling the engine 1. The automatic transmission controller 10 controls the CV unit 7 with reference to information sent from the various sensors 11 to 17. The automatic transmission controller 10 and the engine controller 100 are connected to each other in order to establish information exchange therebetween and control the automatic transmission shift mechanism 3 and the engine 1 in cooperation.

The automatic transmission controller 10 includes a transmission shift control section 10A configured to perform transmission shift control by engagement and release of the frictional engagement members of the automatic transmission shift mechanism 3. The transmission shift control section 10A performs the transmission shift control with reference to a transmission shift chart (i.e., a transmission shift map) described below, depending on vehicle conditions (i.e., the vehicle speed, the accelerator opening degree, and a selected position of the automatic transmission 4). Specifically, the transmission shift control section 10A controls the engagement and release of the frictional engagement members of the automatic transmission shift mechanism 3 via the CV unit 7, so as to achieve a target transmission shift position required in accordance with the transmission shift map.

<Constant Speed Travel Control Section>

The ECU 8 further includes a constant speed travel control section 20 to achieve constant speed travel in response to selecting (i.e., turning ON) of the constant speed travel mode by turning ON of the constant speed travel mode selection switch 16. The constant speed travel control section 20 is configured to manage the transmission shift control performed by the automatic transmission controller 10 and driving force control performed by the engine controller 100, so as to maintain the vehicle speed (i.e., the set speed) set by a driver. The constant speed travel control section 20 controls the automatic transmission controller 10 and the engine controller 100, with reference to information sent from the various sensors 11 to 17.

The set speed for the constant speed travel mode is set with use of a switch for speed setting (not shown). When the constant speed travel mode is ON, the vehicle travels at the set speed maintained independently of acceleration and deceleration operation by a driver, due to action of the constant speed travel control section 20. When the constant speed travel mode is OFF (i.e., when the vehicle is not traveling at the constant speed travel mode), the constant speed travel control section 20 is suspended, and the vehicle travels at a normal travel mode to travel depending on acceleration and deceleration operation by a driver.

The constant speed travel control section 20 calculates a target driving force from the set speed and an actual vehicle speed, and calculates a target engine torque from the target driving force, and then sends it to the engine controller 100. The engine controller 100 controls the driving force of the engine 1, based on the target engine torque sent thereto. Furthermore, the constant speed travel control section 20 calculates the accelerator opening degree from the target driving force and the vehicle speed, and sends it to the automatic transmission controller 10. The automatic transmission controller 10 performs the transmission shift control based on the transmission shift map, depending on the vehicle conditions including the accelerator opening degree sent thereto.

In response to satisfaction of a condition that the vehicle speed deviates from the set speed at or beyond a predetermined amount, the constant speed travel mode is automatically turned OFF, and the constant speed travel control by the constant speed travel control section 20 is automatically cancelled (i.e., forcibly terminated). The predetermined amount is set to a speed range within which the set speed may be deemed to be maintained. Accordingly, the constant speed travel mode is continued if the vehicle speed is within the speed range that has a predetermined width around the set speed.

In addition to the transmission shift control section 10A, the automatic transmission controller 10 includes a slope determination control section 10B, a slope adaptation control section 10C, a delay control section 10D, and a setting section 10E.

<Slope Determination Control Section>

The slope determination control section 10B (i.e., a determination section) has a function to determine whether the vehicle is traveling on a slope road (i.e., a slope determination function). The slope determination control section 10B according to the present embodiment determines whether the vehicle is traveling on a slope road, as follows. The slope determination control section 10B calculates the driving force of the vehicle from, for example, an engine torque that is calculated based on the engine speed measured by the engine speed sensor 15 and the accelerator opening degree measured by the accelerator opening sensor 13. Furthermore, the slope determination control section 10B calculates a travel resistance from the vehicle speed measured by the vehicle speed sensor 12, and calculates an acceleration resistance from an acceleration calculated by time differentiation of the vehicle speed. Because the driving force is equal to a sum of the travel resistance and the acceleration resistance and an inclination resistance, the inclination resistance is calculated from the driving force and the travel resistance and the acceleration resistance. Then, a road inclination is calculated from the inclination resistance, where the road inclination in an upward slope is positive. Accordingly, the slope determination control section 10B can determine whether the vehicle is traveling on a flat road or an upward slope road or a downward slope road, by comparing the road inclination with predetermined plus and minus thresholds. Specifically, the plus threshold (i.e., a positive threshold) and the minus threshold (i.e., a negative threshold) are preset with respect to the road inclination. Then, the vehicle is determined to be traveling on a flat road, if the road inclination is within a range above the minus threshold and below the plus threshold. The vehicle is determined to be traveling on an upward slope road, if the road inclination is equal to or greater than the plus threshold. The vehicle is determined to be traveling on a downward slope road, if the road inclination is equal to or less than the minus threshold.

<Slope Adaptation Control Section>

The slope adaptation control section 10C is configured to implement a control for suppressing upshift during travel at the slope travel mode, i.e., during travel on a slope road. The slope adaptation control section 10C has a function to switch a transmission shift map employed in the transmission shift control of the transmission shift control section 10A, between a first transmission shift map 30 for flat road travel (i.e., for normal travel) and a second transmission shift map 32 for slope road travel. The slope adaptation control section 10C selects the first transmission shift map 30 (i.e., the transmission shift map for normal transmission shift control), if the slope determination control section 10B determines that the vehicle is not traveling on a slope road. The slope adaptation control section 10C selects the second transmission shift map 32 (i.e., the transmission shift map for slope transmission shift control), if the slope determination control section 10B determines that the vehicle is traveling on an upward or downward slope road.

In other words, the slope adaptation control section 10C selectively uses the transmission shift map 30 or 32 depending on whether the vehicle is traveling on a slope road. In case that the vehicle is not traveling on a slope road, the slope adaptation control section 10C performs a first transmission shift control (i.e., the normal transmission shift control) configured to select a predetermined transmission shift position depending on vehicle conditions including the vehicle speed and the accelerator opening degree. In case that the vehicle is traveling on a slope road, the slope adaptation control section 10C performs the second transmission shift control (i.e., the slope transmission shift control) configured to select, depending on the vehicle conditions, a transmission shift position of a lower speed in comparison with the case of being not traveling on a slope road.

According to the present embodiment, the slope adaptation control section 10C is allowed to select the second transmission shift control, when the slope travel mode is selected (i.e., the slope travel mode is ON) due to turning ON of the slope travel mode selection switch 17. The second transmission shift control employing the second transmission shift map 32 is implemented in response to simultaneous satisfaction of the condition that the slope travel mode is ON and the condition that the vehicle is traveling on a slope road. In case that the slope travel mode is not selected (i.e., the slope travel mode is OFF), the second transmission shift control is not selectable, and the first transmission shift control employing the first transmission shift map 30 is implemented even if the slope determination control section 10B determines that the vehicle is traveling on a slope road.

Figure 2A:
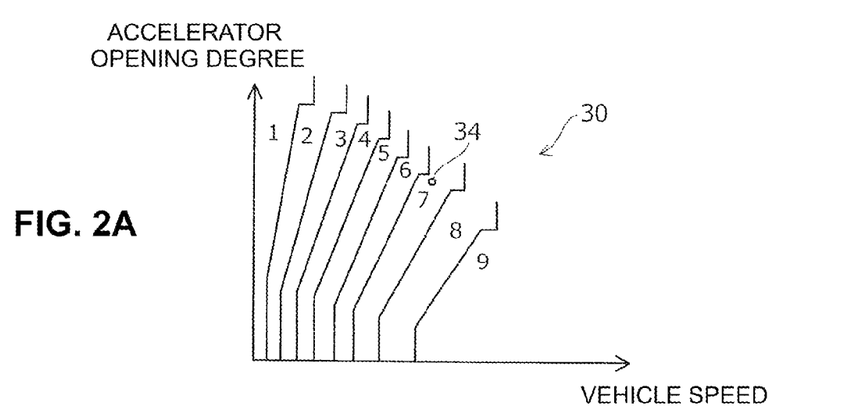
FIG. 2A is a first transmission shift map for travel on a flat road.
Figure 2B:
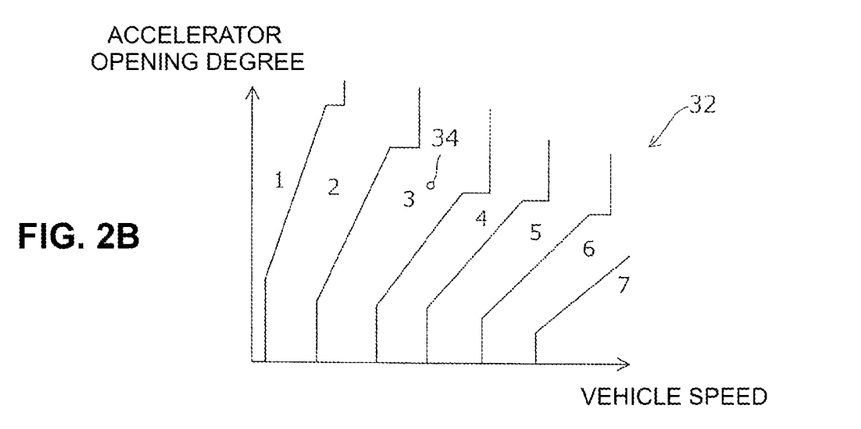
FIG. 2B is a second transmission shift map for travel on a slope road.

The first transmission shift map 30 and the second transmission shift map 32 are stored in the storage of the ECU 8. FIG. 2A shows an example of the first transmission shift map 30 for flat road travel. FIG. 2B shows an example of the second transmission shift map 32 for slope road travel. Each of the first transmission shift map 30 and the second transmission shift map 32 is a transmission shift map for upshift transmission shift control, and has a horizontal axis representing the vehicle speed and a vertical axis representing the accelerator opening degree. Each of the first transmission shift map 30 and the second transmission shift map 32 shows solid lines that represent transmission shift lines for upshift to respective transmission shift positions among the nine forward speed positions, i.e., the first to ninth speed positions. For convenience of drawing, FIG. 2B is drawn omitting a transmission shift line for upshift from the seventh speed position to the eighth speed position and a transmission shift line for upshift from the eighth speed position to the ninth speed position. In addition, although the present embodiment employs the second transmission shift map 32 for both of upward slope roads and downward slope roads, it is allowed to employ different second transmission shift maps 32 for upward slope roads and for downward slope roads.

The first transmission shift map 30 for flat road travel is a transmission shift map for selecting a target transmission shift position suitable for travel on a flat road, and is configured to present a transmission shift position of a higher speed in comparison with the second transmission shift map 32 for slope road travel. The second transmission shift map 32 for slope road travel is a transmission shift map for selecting a target transmission shift position suitable for travel on a slope road, and is configured to present a transmission shift position of a lower speed in comparison with the first transmission shift map 30 for flat road travel.

For example, each of the first transmission shift map 30 and the second transmission shift map 32 shows an operation point 34, where the operation points 34 in the first transmission shift map 30 and the second transmission shift map 32 represent same vehicle speeds and same accelerator opening degrees. In case of using the first transmission shift map 30, the target transmission shift position corresponding to the operation point 34 is selected to be the seventh speed position. In case of using the second transmission shift map 32, the target transmission shift position corresponding to the operation point 34 is selected to be the third speed position. Thus, the use of the second transmission shift map 32 suppresses upshift in comparison with the use of the first transmission shift map 30, and serves to obtain the driving force required for slope road travel.

Upon switching from the second transmission shift map 32 to the first transmission shift map 30 (i.e., switching from the second transmission shift control to the first transmission shift control), the target transmission shift position is upshifted from the third speed position to the seventh speed position (i.e., from a lower speed position to a higher speed position) if the operation point 34 is maintained constant. In such a situation, an upshift delay control described below is implemented for suppression of busy shift.

<Delay Control Section>

The delay control section 10D (i.e., a delaying section) performs the upshift delay control that includes performing upshift in transmission shift position one by one at predetermined time intervals until reaching the target transmission shift position, upon switching from the second transmission shift control to the first transmission shift control. The upshift delay control avoids rapid upshift from a lower speed transmission shift position to a higher speed transmission shift position, such that the upshift slowly proceeds one by one at the predetermined time intervals. This serves to avoid busy shift. Each of the predetermined time intervals in the upshift delay control refers to a time interval between completion of a previous upshift and execution of a subsequent upshift. For example, in case of upshifting one by one from the third speed position to the fifth speed position, the predetermined time interval corresponds to a time interval between completion of an upshift to the fourth speed position and start of an upshift from the fourth speed position to the fifth speed position.

In case of traveling at the constant speed travel mode, the upshift delay control upon switching from the second transmission shift map 32 to the first transmission shift map 30 as described above may cause excess in driving force as follows. In case of traveling on a slope road at the constant speed travel mode, the set speed is maintained with use of a lower speed transmission shift position set based on the second transmission shift map 32, while operating the engine 1 in a relatively high engine speed region so as to obtain a driving force required for the constant speed travel. When moving from the slope road to a flat road under such a situation, the driving force required for the constant speed travel falls. Accordingly, it is required to reduce the driving force of the engine 1 by switching from the second transmission shift map 32 to the first transmission shift map 30 and thereby reducing the engine speed of the engine 1. However, if the upshift delay control is implemented upon switching from the second transmission shift map 32 to the first transmission shift map 30, the reduction in engine speed of the engine 1 is delayed, and then the reduction in driving force of the engine 1 is delayed. This causes the vehicle to undergo acceleration due to excess in engine driving force in comparison with the driving force required for the constant speed travel. In view of the foregoing, the present embodiment is configured to set the time intervals of the upshift delay control to be shorter in case that the constant speed travel mode is ON, in comparison with case that the constant speed travel mode is OFF.

<Setting Section>

The setting section 10E is configured to shorten the time intervals of the upshift delay control in case that the constant speed travel mode is ON. In detail, in case that the constant speed travel mode is OFF, the setting section 10E sets the time intervals of the upshift delay control to predetermined time intervals D1 longer in comparison with case that the constant speed travel mode is ON. In case that the constant speed travel mode is ON, the setting section 10E sets the time intervals of the upshift delay control to predetermined time intervals D2 shorter than the time intervals D1. The time intervals D1 are longer time periods sufficient for suppression of busy shift: e.g., approximately three to four seconds. The time intervals D2 are shorter time periods sufficient for suppression of increase in driving force to terminate the constant speed travel mode, while still suppressing busy shift: e.g., approximately one to two seconds.

3. Flow Chart

Figure 3:
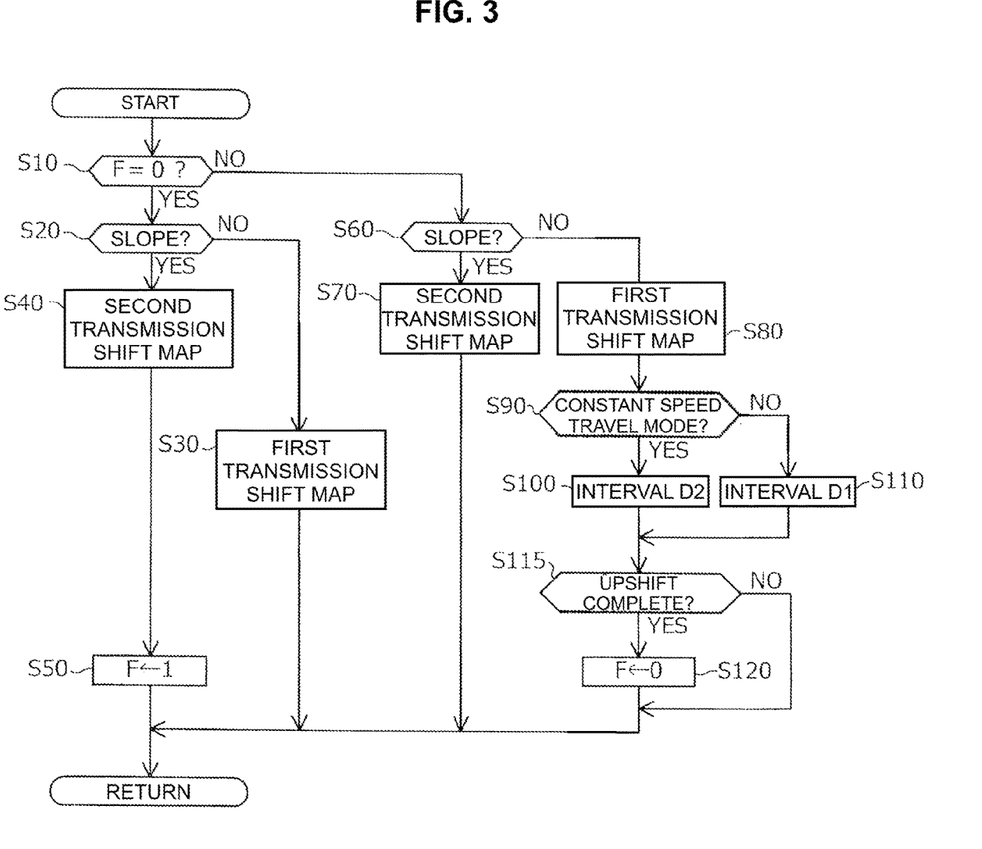
FIG. 3 is a flow chart showing processes of control for switching the transmission shift maps.

FIG. 3 is an exemplary flow chart to explain contents of control for switching the transmission shift map as described above. This flow is implemented repetitively at a predetermined period during travel of the vehicle. The flow presupposes that the slope travel mode has been set ON by the slope travel mode selection switch 17. The following description presents a slope flag F set to F=1 in response to determination that the vehicle is traveling on a slope road, and set to F=0 in response to determination that the vehicle is not traveling on a slope road (i.e., is traveling on a flat road).

Step S10 is determination of whether the condition F=0 is satisfied. If the condition F=0 is satisfied (i.e., YES in step S10), step S20 is executed to determine whether the vehicle is traveling on a slope road, in the slope determination control section 10B. If not traveling on a slope road (i.e., NO in step S20), step S30 is executed to select the first transmission shift map 30 for flat roads, as the transmission shift map used in the transmission shift control.

If the condition F=0 is satisfied (i.e., YES in step S10) and the vehicle is traveling on a slope road (i.e., YES in step S20), the vehicle is determined to have moved from a flat road to the slope road. In this case, step S40 is executed to select the second transmission shift map 32 for slope roads, as the transmission shift map used in the transmission shift control. This switches the transmission shift map used in the transmission shift control, from the first transmission shift map 30 for flat roads to the second transmission shift map 32 for slope roads. Subsequently, step S50 is executed to set the slope flag F to F=1.

On the other hand, in case of F=1 (i.e., NO in step S10), step S60 is executed to determine whether the vehicle is traveling on a slope road, in the slope determination control section 10B. If traveling on a slope road (i.e., YES in step S60), step S70 is executed to select the second transmission shift map 32 for slope roads, as the transmission shift map used in the transmission shift control.

If the condition F=1 is satisfied (i.e., NO in step S10) and the vehicle is not traveling on a slope road (i.e., NO in step S60), the vehicle is determined to have moved from the slope road to a flat road. In this case, step S80 is executed to select the first transmission shift map 30 for flat roads, as the transmission shift map used in the transmission shift control. This switches the transmission shift map used in the transmission shift control, from the second transmission shift map 32 for slope roads to the first transmission shift map 30 for flat roads.

Subsequently to this, step S90 is executed to determine whether the constant speed travel mode is ON. If the constant speed travel mode is ON (i.e., YES in step S90), step S100 is executed to set the time intervals in the upshift delay control to the time intervals D2 being shorter ones. If the constant speed travel mode is OFF (i.e., NO in step S90), step S110 is executed to set the time intervals in the upshift delay control to the time intervals D1 being longer ones. Thereafter, step S115 is executed to determine whether current upshift is completed. If the current upshift is not completed (i.e., NO in step S115), the processes of steps S80 to S115 are repeated because of NO in steps S10 and S60. If the current upshift is completed (i.e., YES in step S115), step S120 is executed to set the slope flag F to F=0.

Figure 4A:
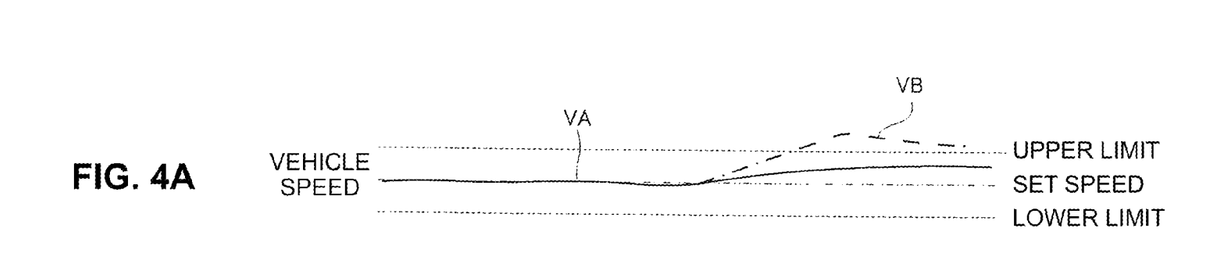
FIGS. 4A, 4B, and 4C are timing charts for explanation of transmission shift control and upshift delay control.
Figure 4B:
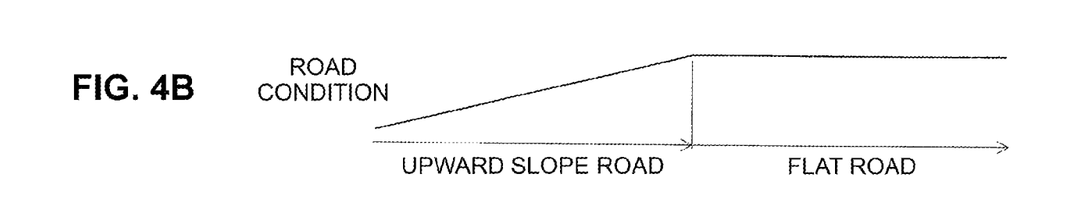
Figure 4C:
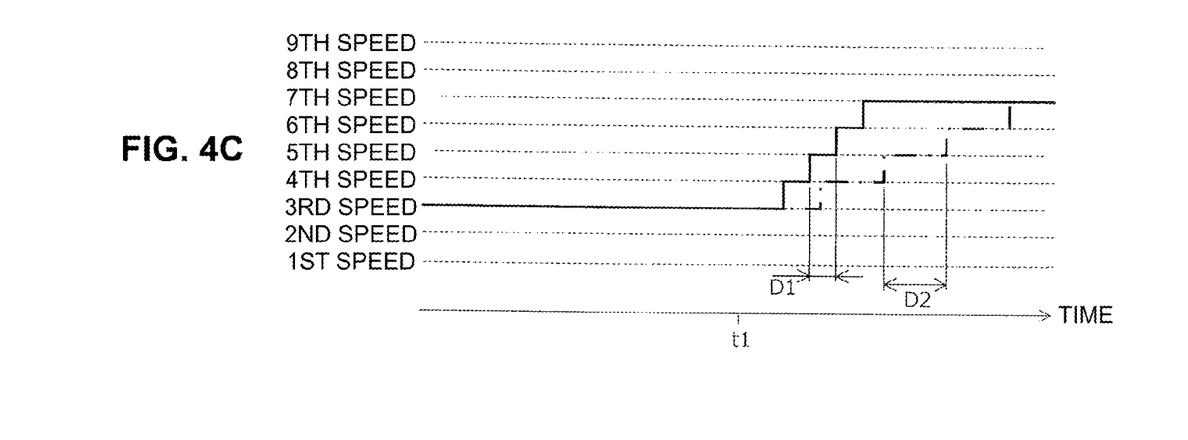

FIGS. 4A, 4B, and 4C are timing charts for explanation of the transmission shift control and the upshift delay control. Each of FIGS. 4A, 4B, and 4C shows a horizontal axis being a time axis. FIG. 4A shows a solid line representing a vehicle speed VA at each time instant. FIG. 4B shows a condition of a road on which the vehicle travels. FIG. 4C shows timings at which upshift or downshift among the transmission shift positions are implemented.

FIGS. 4A, 4B, and 4C show a travel situation in which the vehicle moves from an upward slope road to a flat road during traveling at the constant speed travel mode. The vehicle travels on the upward slope road until a time instant t1, and reaches a top of the upward slope road at the time instant t1, and moves to the flat road after the time instant t1.

Until the time instant t1, the second transmission shift control (i.e., the slope transmission shift control) is performed, in which a lower speed transmission shift position (e.g., the third speed position) in comparison with flat road travel is selected based on the second transmission shift map 32 for slope roads. In case that the constant speed travel mode is ON on this occasion, the engine controller 100 drives the engine 1 at a relatively high engine speed so as to maintain the vehicle speed VA within a range (shown by broken lines) having a certain width including a set speed (shown by a two-dot dashed line). This serves to obtain a driving force required for climbing the upward slope road.

After the time instant t1, in response to determination that the vehicle is not traveling on the upward slope road, the transmission shift map is switched from the second transmission shift map 32 for slope roads to the first transmission shift map 30 for flat roads, and the transmission shift control returns to the first transmission shift control (i.e., the normal transmission shift control). Due to this, the target transmission shift position is changed from the third speed position to the seventh speed position (see FIGS. 2A and 2B). As shown by a solid line in FIG. 4C, in case that the constant speed travel mode is ON, the upshift from the third speed position to the seventh speed position proceeds one by one at the shorter time intervals D1. This shortens a time period for travel at the lower speed transmission shift position under the high engine speed, and serves to timely reduce the engine speed of the engine 1, and appropriately reduce the driving force of the engine 1, and thereby maintain the vehicle speed VA within the range without exceeding an upper limit of the set speed.

In case that the constant speed travel mode is OFF, as shown by a one-dot dashed line in FIG. 4C, the upshift from the third speed position to the seventh speed position proceeds one by one slowly at the longer time intervals D2. This lengthens the time period for travel at the lower speed transmission shift position under the high engine speed, and may increase the vehicle speed VB more than the vehicle speed VA, as shown by a one-dot dashed line in FIG. 4A. However, such increase in vehicle speed VB can be coped with by acceleration and deceleration operation etc. by a driver, because the constant speed travel mode is OFF.

FIGS. 4A, 4B, and 4C exemplify the situation of moving from the upward slope road to the flat road. The same applies to a situation of moving from a downward slope road to a flat road, except for a point that the road condition in FIG. 4B changes to show transition from the downward slope road to the flat road, differently from the situation of moving from the upward slope road to the flat road. Specifically, during travel on the downward slope road, the second transmission shift map 32 for slope roads is employed to select a lower speed transmission shift position (e.g., the third speed position) in comparison with flat road travel. After finishing the travel on the downward slope road, in response to determination that the vehicle is not traveling on the downward slope road, the transmission shift map is switched from the second transmission shift map 32 to the first transmission shift map 30 for flat roads. The upshift on this occasion proceeds one by one at the shorter time intervals D1. This shortens the time period for travel at the lower speed transmission shift position under the high engine speed, and serves to timely reduce the engine speed of the engine 1, and appropriately reduce the driving force of the engine 1, and thereby maintain the vehicle speed VA within the range without exceeding the upper limit of the set speed.

4. Effects (1) The automatic transmission controller 10 (i.e., the control device for the automatic transmission) described above serves to suppress excess in driving force by setting the time intervals in the upshift delay control to the shorter time intervals D1 in response to switching from the second transmission shift control to the first transmission shift control, under a situation that the vehicle moves to a flat road subsequently to travel on a slope road at the constant speed travel mode. In case of being not traveling at the constant speed travel mode, i.e., in case of being traveling in accordance with operation by a driver, the upshift delay control is implemented at the longer time intervals D2 even if the slope travel mode is ON. This serves to certainly avoid busy shift, and prevent the constant speed travel mode from being interrupted due to interference from the constant speed travel control and the upshift delay control to the constant speed travel mode.

(2) The first transmission shift control is implemented with use of the first transmission shift map 30 for flat roads, and the second transmission shift control is implemented with use of the second transmission shift map 32 for slope roads. This serves to suppress busy shift, while selecting depending on the vehicle conditions a transmission shift position appropriate for a slope road and a flat road respectively.

(3) The configuration to provide the slope travel mode selection switch 17 for selecting the slope travel mode enabling the second transmission shift control and the constant speed travel mode selection switch 16 for selecting the constant speed travel mode serves to suppress excess in driving force, in a situation that the vehicle moves to a flat road subsequently to travel on a slope road, under a condition that both of the constant speed travel mode and the slope travel mode are ON.

(4) The vehicle is configured to suppress excess in driving force when the vehicle moves from a slope road to a flat road at the constant speed travel mode. This avoids termination of the constant speed travel mode that is terminated if the deviation of the vehicle speed from the set speed exceeds the predetermined amount. This serves to more certainly continue travel at the constant speed travel mode.

5. Others

The above contents of control for switching the transmission shift map are merely examples. The contents of control for switching the transmission shift map are not limited to the above described ones. The vehicle to which the automatic transmission controller 10 (i.e., the control device for the automatic transmission) according to the present embodiment is mounted may be any kind of vehicle. For example, a vehicle towing a towed vehicle (e.g., a trailer) is likely to undergo excess in driving force upon moving from a slope road to a flat road, due to a great total weight thereof. In such case, the control according to the present embodiment for shortening the time intervals in the upshift delay control when the constant speed travel mode is ON is suitable for the vehicle towing the towed vehicle. The embodiment described above relates to a control device for an automatic transmission and a control method for an automatic transmission.

The present application claims a priority of Japanese Patent Application No. 2019-114457 filed with the Japan Patent Office on Jun. 20, 2019, all the contents of which are hereby incorporated by reference.

The invention claimed is:

1. A control device for an automatic transmission installed in a vehicle, wherein the vehicle has a constant speed travel mode configured to perform transmission shift control on the automatic transmission and driving force control on a driving prime mover in order to maintain a vehicle speed at a set speed, the control device comprising:
 a determination section configured to determine whether or not the vehicle is traveling on a slope road;
 a slope adaptation control section configured to implement a first transmission shift control if determined that the vehicle is not traveling on a slope road, and implement a second transmission shift control if determined that the vehicle is traveling on a slope road, wherein:

the first transmission shift control includes selecting a predetermined transmission shift position depending on a vehicle condition; and the second transmission shift control includes selecting, depending on the vehicle condition, a transmission shift position of a lower speed in comparison with case of determined that the vehicle is not traveling on a slope road;

a delaying section configured to implement an upshift delay control upon switching from the second transmission shift control to the first transmission shift control, wherein the upshift delay control includes performing upshift in transmission shift position one by one at a predetermined time interval; and a setting section configured to, in case that the vehicle is traveling at the constant speed travel mode, set the time interval shorter in comparison with case that the vehicle is traveling not at the constant speed travel mode.

2. The control device as claimed in claim 1, wherein the slope adaptation control section is configured to employ a first transmission shift map for travel on a flat road, in the first transmission shift control, and employ a second transmission shift map for travel on a slope road, in the second transmission shift control.

3. The control device as claimed in claim 1, the control device further comprising:

a constant speed travel mode selection switch configured to select the constant speed travel mode; and a slope travel mode selection switch configured to select a slope travel mode in which the second transmission shift control is allowed to be selected.

4. The control device as claimed in claim 1, wherein the constant speed travel mode is terminated in response to satisfaction of a condition that the vehicle speed deviates from the set speed at or beyond a predetermined amount.

5. A control method for an automatic transmission installed in a vehicle, wherein the vehicle has a constant speed travel mode configured to perform transmission shift control on the automatic transmission and driving force control on a driving prime mover in order to maintain a vehicle speed at a set speed, the control method comprising:

determining whether or not the vehicle is traveling on a slope road;

implementing a first transmission shift control if determined that the vehicle is not traveling on a slope road, wherein the first transmission shift control includes selecting a predetermined transmission shift position depending on a vehicle condition;

implementing a second transmission shift control if determined that the vehicle is traveling on a slope road, wherein the second transmission shift control includes selecting, depending on the vehicle condition, a transmission shift position of a lower speed in comparison with case of determined that the vehicle is not traveling on a slope road;

implementing an upshift delay control upon switching from the second transmission shift control to the first transmission shift control, wherein the upshift delay control includes performing upshift in transmission shift position one by one at a predetermined time interval; and in case that the vehicle is traveling at the constant speed travel mode, setting the time interval shorter in comparison with case that the vehicle is traveling not at the constant speed travel mode.

\* \* \* \* \*